UNITED STATES PATENT OFFICE.

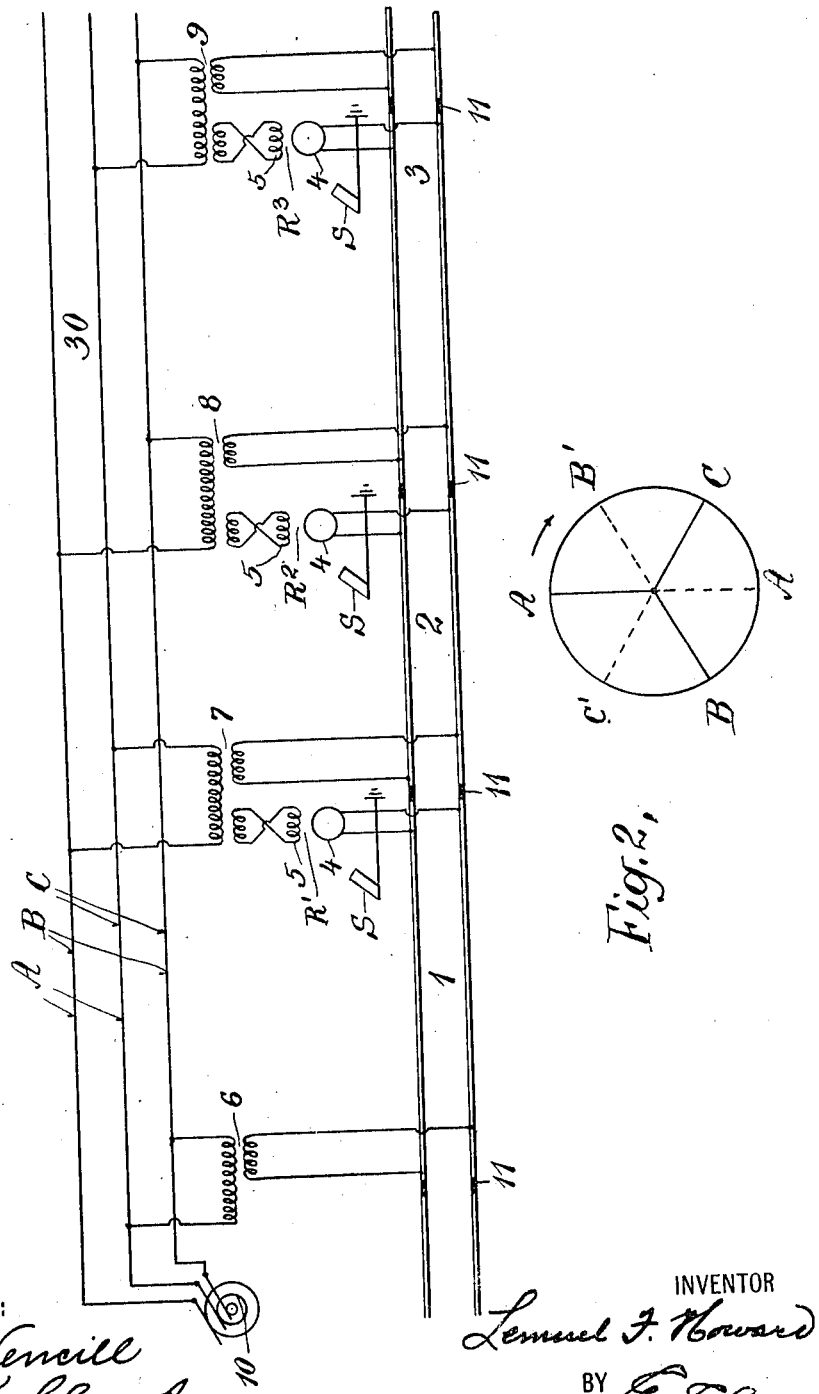

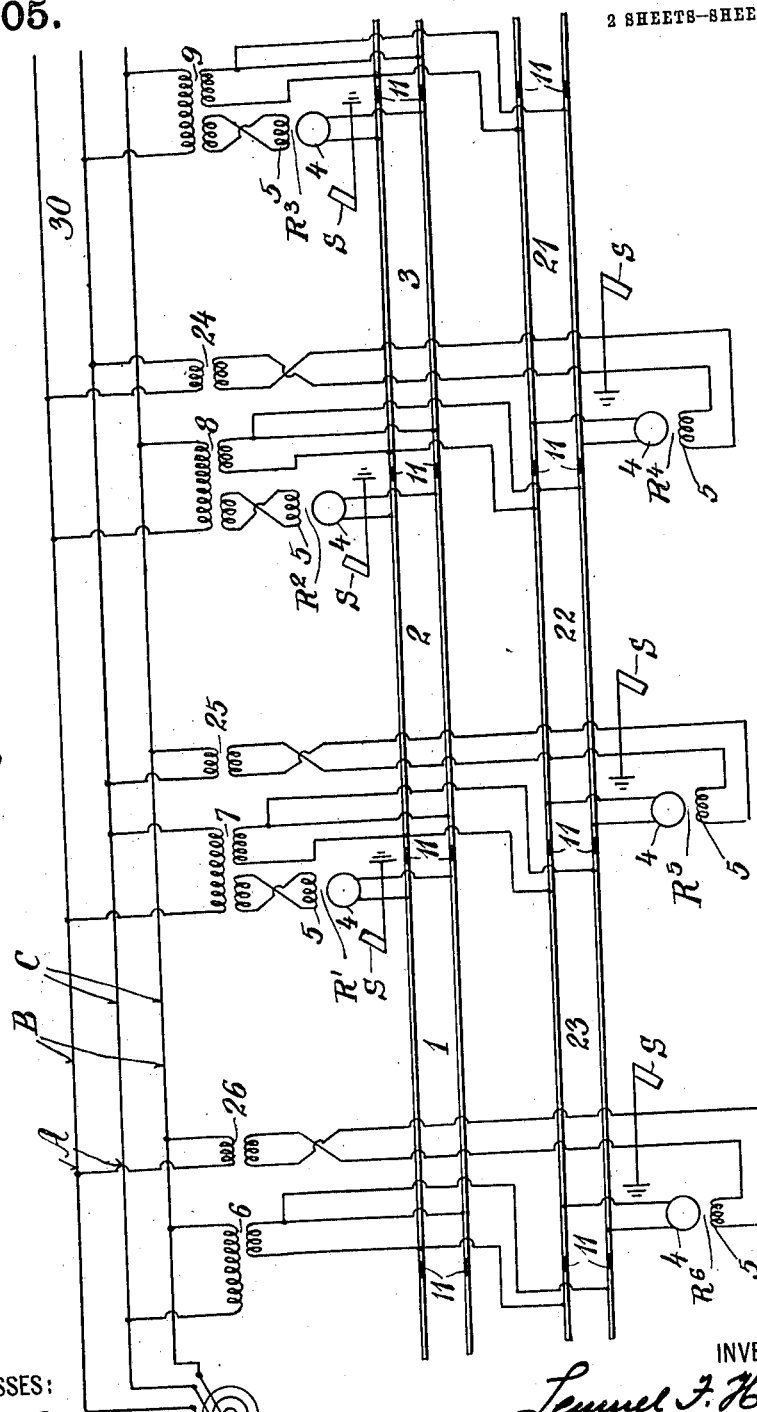

LEMUEL F. HOWARD, OF EDGEWOOD PARK, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY SIGNALING SYSTEM.

1,035,705.

Specification of Letters Patent. Patented Aug. 13, 1912.

Application filed April 23, 1910. Serial No. 557,141.

*To all whom it may concern:*

Be it known that I, LEMUEL F. HOWARD, a citizen of the United States, residing at Edgewood Park, in the county of Allegheny and State of Pennsylvania, have invented certain new and useful Improvements in Railway Signaling Systems, of which the following is a specification.

My invention relates to alternating current signaling systems, and particularly to such systems employing a relay comprising two windings having different power factors, one of which windings receives current from a track circuit and another of which receives current directly from a source of current such as a transmission line extending along the railway.

It is an object of my invention to bring the currents in the two windings into approximately the same phase. It has heretofore been customary to accomplish this purpose by the use of a resistance in series with the winding having the lower power factor. This involves, however, a loss of energy in the series resistance.

My invention comprises a polyphase transmission line and means for compensating for a difference in power factor of the two windings of the relay by supplying current to these two windings from different phases of the line in such manner that the currents in the two windings shall be in phase or approximately so.

I will describe a railway signaling system embodying my invention and will then point out the novel features thereof in claims.

In the accompanying drawings, Figure 1 is a diagrammatic view showing a railway signaling system embodying my invention. Fig. 2 is a diagram showing the angular relation between the phases of the transmission line in the system of Fig. 1. Fig. 3 is a view similar to Fig. 1, but showing a railway signaling system embodying my invention applied to a two-track railway.

Similar reference characters refer to similar parts throughout the several views.

Referring now to Fig. 1, I have herein shown a railway signaling system the energy for which is derived from a three-phase generator 10. A transmission line 30 extends from this generator along the line of the railway, the three phases in this line being designated respectively by A, B and C. 1, 2 and 3 are block sections of a railway, formed by insulation joints 11 in one or both lines of rails. Each block section is protected by a signal, S, the operation of which is controlled by relays $R^1$, $R^2$, and $R^3$ respectively. These relays may be of a type having one winding thereof connected across the track rails of the track-circuit and another winding across the source of signaling current. In these relays, one winding 4, the armature for example, is connected with the track rails, and another winding 5, for example the field, is connected with the transmission line. 6, 7, 8 and 9 designate transformers whose primaries are connected across the transmission line and which have two secondary windings. One of these secondary windings supplies energy to one of the adjacent track circuits, while the other secondary supplies energy to the field winding of the relay for the other adjacent track circuit.

Assume that if the two windings of the relay $R^1$ were supplied from a single-phase transmission line, the current in the field winding 5 would lag, approximately, 60° behind the current in the armature winding 4. By supplying the track circuit of block section 1 with current from phase C of the three-phase line, and the field winding 5 of relay $R^1$ with current from phase A swung around through 180°, the two currents in the field and armature windings will be approximately in phase and a maximum torque will result. This will be more clearly seen by reference to Fig. 2 in which A, B and C represent the three phases of the transmission line, and $A^1$, $B'$ and $C'$ represent these three phases swung around through 180°. As stated above, the track circuit for block section 1 being supplied from phase C and the field winding of the relay from phase $A^1$ (phase A swung through 180°), the currents in the two windings of the relay will be approximately in the same phase, because the phase of the E. M. F. supplied the field (phase $A^1$) will be 60° ahead of that supplied the armature (phase C). The phase of the field winding is shown herein as swung through 180° by reversing the terminals of the transformer to which it is connected. It may be done equally well by constructing the relay in such manner that the two windings will be in opposition. Similarly, for block section 2, the track circuit may be supplied with current from phase A and the field winding 5 of relay R² with current from phase B¹ (phase B swung through 180°) and the currents in the two windings of the relay R² will be, approximately, in phase. For block-section 3 the phases in the two windings of relay R³ may be made approximately the same by supplying current to the track circuit from phase B and to the field winding of the relay from phase C¹ (phase C swung through 180°).

Referring now to Fig. 3, I have herein shown a system similar to that shown in Fig. 1, but applied to a two-track railway. Since one track is laid out with track circuits in one direction, the same relations do not obtain on the second track having the track circuits laid out in the opposite direction, hence the introduction of another phase at each signal location is necessary. I have here shown this as being accomplished by the use of additional transformers 24, 25 and 26 for the field windings of relays R⁴, R⁵ and R⁶ respectively. The track circuits for each of the block sections 21, 22 and 23 are supplied with current from the same transformer as each of the block sections 1, 2 and 3 respectively. Since the track circuit for block section 21 receives current from phase C and the field winding of relay R⁴ receives current from phase A¹ (phase A swung through 180°) the currents in the two windings of relay R⁴ are approximately in phase. A similar relation holds for relays R⁵ and R⁶.

The system of connections which I have herein shown is so arranged that the feature of protection against the showing of a false clear signal in case of broken-down insulation joints—a protection which may be obtained from a two-winding relay of the type referred to when used in connection with a single-phase transmission line—is not lost. For example, referring to Fig. 1, in case the insulation joints between sections 1 and 2 should break down, the armature and field windings of relay R¹ would each be fed with current from phase A, that in the field winding being swung through 180°. This would cause relay R¹ to operate in the reverse direction to that required to cause the signal S to give a safety indication, and a danger indication would be given. Similar conditions hold true for all of the block sections in both Figs. 1 and 3.

Although I have herein shown and described only one form of a railway signaling system embodying my invention, it is understood that various changes and modifications may be made therein within the scope of the appended claims without departing from the spirit and scope of my invention.

Having thus described my invention, I claim:

1. In a railway signaling system, a track circuit, a source of alternating signaling current connected therewith, a relay comprising two windings having different power factors, one of which windings is connected with the track circuit, a separate source of alternating signaling current connected with the other relay winding, the two said sources of alternating current having the same frequency and having an angular phase displacement approximately equal to the difference between the angles of lag of the two relay windings.

2. In a railway signaling system, a track circuit, a relay comprising two windings having different power factors, one of which windings is connected with the track circuit, a source of polyphase signaling current, one phase of which is connected with the track circuit and another phase with the other winding of the relay, the angular relation between the two said phases being approximately equal to the difference between the angles of lag of the said relay windings.

3. In a railway signaling system, a track circuit, a relay comprising two windings having different power factors, one of which windings is connected with the track circuit, a source of polyphase signaling current, one phase of which is connected with the track circuit and another phase with the other winding of the relay, the relation between the two said phases being such that the currents in the two relay windings will be in substantially the same phase.

4. In a railway signaling system, a track circuit, a relay comprising two windings having different power factors, one of which windings is connected with the track circuit, two sources of alternating signaling current having the same frequency and having an angular phase relation substantially equal to the difference between the angles of lag of the two said relay windings when energized by said current, one of said sources being connected with the track circuit and the other with the other winding of the relay.

5. In a railway signaling system, a track circuit, a relay comprising two windings whose angles of lag when energized by currents of the same frequency differ by substantially sixty degrees, one of which windings is connected with the track circuit, a source of alternating signaling current having two phases one hundred and twenty degrees apart, one of which phases is connected with the track circuit and the other of which is connected with the other winding of the relay, the connection of one of said phases being reversed so that the phase is swung through one hundred eighty degrees, whereby the currents in the two windings of the relay are approximately in phase.

6. In a railway signaling system, two sources of alternating signaling current having relative angular phase displacement, a track circuit connected with one of said sources, a relay comprising two windings whose difference of angular lag when energized by said signaling current is substantially equal to the angular phase displacement of the two sources, one of which windings is connected with the track circuit and the other with the other source of signaling current.

7. In a railway signaling system, a source of three-phase signaling current, a track circuit connected with one of the phases thereof, a relay comprising two windings whose angles of lag when energized by current of the frequency of the said signaling current differ by substantially sixty degrees, one of which windings is connected with the track circuit, and the other with another phase of the signaling current, and means for swinging the last mentioned phase through one hundred and eighty degrees, whereby the angular relation between the voltages impressed upon the two relay windings is substantially sixty degrees.

8. In a railway signaling system, a plurality of block sections, a track circuit for each block section, a relay for each block section comprising two windings having different power factors, one of which windings is connected with the track circuit for the corresponding block section, a source of polyphase signaling current, means for connecting one phase of said source with each track circuit, and means for connecting another phase of said source with the other winding of the relay for each block section, the angular relation between the two phases employed for each block section being approximately equal to the difference between the angles of lag of the said relay windings for such block section.

9. In a railway signaling system, a plurality of track circuits, a relay for each track circuit each comprising two windings having different power factors one of which windings is connected with the track circuit, a source of polyphase signaling current, means for supplying each track circuit with one phase of said source, and means for supplying the remaining winding of each relay with a phase of said source different from the phase with which the corresponding track circuit is supplied, the angular difference between the two phases thus supplied to the two windings of each relay being approximately equal to the difference between the angles of lag of said windings at the frequency of the said current.

10. In a railway signaling system, a plurality of track circuits, a relay for each track circuit each comprising two windings whose angles of lag at the same frequency differ by substantially sixty degrees, one of which windings is connected with the track circuit, a source of three phase signaling current, means for supplying the successive track circuits from one of the phases in rotation, means for supplying the remaining winding of each relay with a phase of the current different from that supplied to the corresponding track circuit, the connection of one of the phases for each track circuit being reversed so that the phase is swung through one hundred eighty degrees whereby the currents in the two windings of each relay are substantially in phase.

11. In a railway signaling system, a plurality of track circuits, a relay for each track circuit each having two coöperating windings one of which windings is connected with the track circuit, a source of polyphase signaling current, means for connecting each track circuit with a phase of said source, adjacent track circuits being connected with different phases, and means for supplying the remaining winding of each relay with a phase of said source which will coöperate with the current supplied to the track winding from the corresponding track circuit to energize the relay but which will coöperate with stray current from an adjacent track circuit in the said track winding of the relay to hold the relay open.

12. In a railway signaling system, a plurality of electrically insulated track circuits, a source of polyphase signaling current, means for supplying the track circuits with signaling current from the said source, the currents for adjacent track circuits differing in phase, relays one for each track circuit each having a winding energized from the track circuit and a second winding energized from the said source independently of the track circuit with current of a phase which will coöperate with current from the track circuit with which the relay is connected to actuate the relay to hold its contacts closed and which will coöperate with leakage current from the next adjacent track circuit to actuate the relay to hold its contacts open.

In testimony whereof, I have signed my name to this specification in the presence of two subscribed witnesses.

LEMUEL F. HOWARD.

Witnesses:
ELMER R. COE,
JOHN S. HOLLIDAY.